Aug. 26, 1969     G. H. LEDERER     3,463,293
GYRO CONVEYANCE METHOD
Filed May 18, 1967
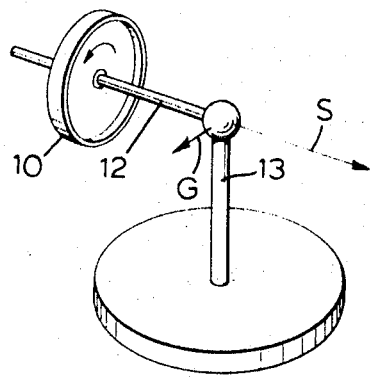
FIG. 1
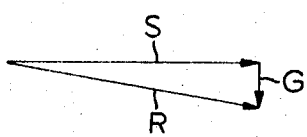
FIG. 2
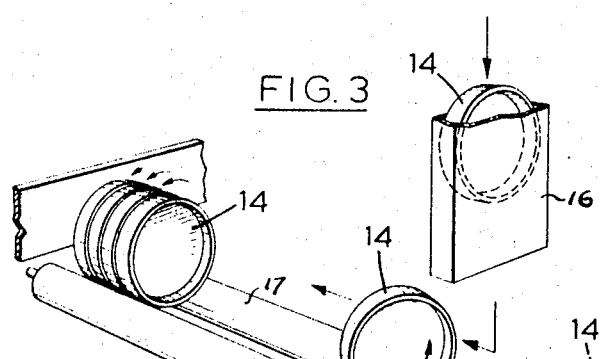
FIG. 3
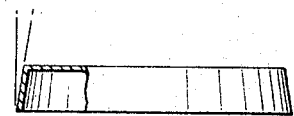
FIG. 4
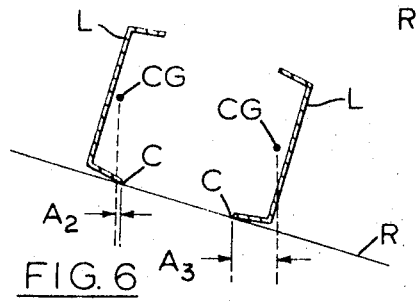
FIG. 5
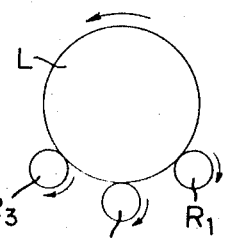
FIG. 7
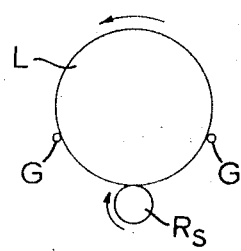
FIG. 8
FIG. 6
INVENTOR
GEORGE H. LEDERER
BY
*Westell & Hanley*

3,463,293
GYRO CONVEYANCE METHOD
George H. Lederer, 75 Gordon Road,
Willowdale, Ontario, Canada
Filed May 18, 1967, Ser. No. 639,529
Int. Cl. B65g 47/24
U.S. Cl. 198—33                                6 Claims

ABSTRACT OF THE DISCLOSURE

The invention uses the gyro principle to sort or convey articles with circular rims and a centre of gravity offset from such rim, when such articles are supported (or partially supported) and rotating relative to a rotating cylinder.

---

This invention is directed to a process which uses the gyroscopic precession principle for causing the travel of bodies which are primarily surfaces of revolution and which may be rotated rapidly while supported on a circular locus which is a part of said surface.

Such bodies include any body which can be viewed in two dimensions as a circular object, such as wheels, round plastic lids, etc. However the inventive process only operates on those of such bodies which have a centre of gravity offset from the plane of such circular locus and which may tip the plane of said locus at least to a small degree when solely supported on the locus of said circle.

FIGURE 1 demonstrates the gyro precession principle;

FIGURE 2 is a vector drawing illustrating the precession principle;

FIGURE 3 shows the invention applied to cause the travel of plastic lids;

FIGURE 4 shows a cross-section of such lid;

FIGURES 5 and 6 are schematic illustrations of the operation of the invention; and FIGURES 7 and 8 are schematic illustrations on variants of the preferred method of the invention.

In FIGURE 1 is schematically shown a toy or demonstration gyro where a wheel 10 can be made to rotate rapidly on shaft 12 which is universally mounted at one end only on a support 13. The rotation of the wheel is clockwise looking from left toward right in FIGURE 1 and the angular momentum caused by such rotation is represented by the vector S in such drawing. During such rotation the force of gravity exerts a moment on the shaft (and hence on the wheel) which is counter-clockwise as viewed in FIGURE 1. Such resultant angular momentum (very small) may be represented as a vector G out of the plane of the paper in FIGURE 1. In FIGURE 2 the vectors S and G are added, the view of FIGURE 2 being downward. It will be seen that the resultant angular momentum vector R from the addition of vectors S and G is clockwise looking downwardly from vector S. As the wheel axis tries to align itself with vector R therefore the angular momentum vector S (and hence the wheel axis) turns or precesses clockwise in the view of FIGURE 2.

The same gyroscopic precession occurs at the front wheel of a traveling bicycle when the bicycle is tilted to the right about the fore and aft axis, the resultant gyroscopic moment on the wheel causes it to turn to the right about a vertical axis.

My invention makes use of the fact that if a rotating body is supported and rotated through a surface of revolution of said body by at least one rotating roller where such roller at least partially supports such article while rotating in such manner that said article may tip slightly under gravity or may turn about an axis perpendicular to the tipping axis of rotation. All rollers used for such support (usually two) rotate in the same sense and are approximately parallel. The articles with which the invention is used have a centre of gravity offset axially from the intended support locations, then, if such body while rotating with its surface contacting said rollers tends to tip slightly under gravity, the tendency to so tip through the gyro effect, causes the body to turn its rotational axis (being the phenomena of gyro precession) slightly about an axis perpendicular to its rotational and its tipping axis and relative to the axis of rotation of such rollers. The result is that the rotating body will tend to encounter the supporting roller or rollers along a helical locus and travel axially along the rollers in a sense determined by the sense of offset of its centre of gravity relative to the rolling points of support of the body. It should be noted that for any texture of the contacting surfaces of rotating rollers and surface of revolution, the roller axes may be tilted to such a degree that the rotating body, while rotating on and supported by said rollers, will simply slide freely axially along said rollers so that axial travel of said body will be due to such sliding rather than gyro precession.

The point that the inventive method does not extend to the use of rollers tilted to such an extent that wholesale sliding takes place, should not be confused with the fact that a small sliding takes place in carrying out the method of the invention. The small sliding occurs at a point of contact of an article with a roller and such sliding takes places because the article has precessed so that its axis is not parallel to the roller it contacts, so that the contacting points of roller and article are rotating about non-parallel axes. Here the translation of the article is primarily due to the helical rolling of the article along the rollers. The invention therefore does not extend to uses of rollers for rotating articles where the tilt of the rollers is such that the movement of the article therealong is a free sliding one, that is, the type of sliding which would take place if the lid were not rotating and on a slanted surface.

The inventive process utilizing gyro precession has a number of practical applications. With articles of round contour in their major dimensions, such as plastic lids, the lids which usually have a centre of gravity offset from their widest diameter and when placed on the rotating substantially parallel rollers in the same orientation will travel to one end of such rollers for stacking or orientation. It is noted that the same conveyance means may also be used for any other body which may be supported on a surface of revolution thereof with the centre of gravity thereof offset from the plane of the circular locus where the surace of revolution is supported by said rollers.

The method may also be used to sort articles of round contour in their major dimensions, such as lids or wheels, which are supported and rotated on such parallel rollers, rotating in the same sense, but with an offset centre of gravity projecting in one or the other axial sense, so that the article will travel axially along the rollers in a sense determined by the sense in which centre of gravity is offset.

The method may also be used to determine axial unbalance in articles of round contour in their major dimensions. If such an article is placed on rapid, axially rotating rollers, then the unbalance of such article in an axial direction will determine the direction of tavel of such article along the rollers and the amount of such unbalance will, for a given roller rotational speed, determine the speed of axial travel of the article along the rollers. The relationship of speed to amount of offset will usually not be a simple one due to the effect of article and roller contours at various precessional twists.

The device may also form the basis of scientific toys and games.

There are preferably two rollers and these are preferably substantially parallel but the invention may be practised where such rollers are only approximately parallel. The limits on the angle of convergence and divergence is where the divergence is such that the precessed lids will tend to drop between the rollers or where the convergence-divergence is such that the lid tends to slide from the converging toward the diverging ends even though the rollers are horizontal.

In FIGURE 2 is shown a preferred embodiment of the invention. In the drawings a pair of substantially parallel rollers 15 and 17 are geared or otherwise connected for rotation in the same sense by means not shown. The rollers are spaced to support, and rotate, during mutual rotation, a plastic lid 14. The lid is of a type which is round in its major dimensions and the lid therefore includes a surface of revolution defining a locus whereon the lid may be supported during rotation. Although the lid shown would, to the naked eye, appear to have a flat rim, it will be seen from FIGURE 4 that such lid like most plastic lids has the free end of such rim of slightly larger diameter than the remainder of such rim. The wider diameter portion of said rim defines the locus of support for said lid during rotation of such rollers and it will be seen that the centre of gravity of the lid is thereby offset axially from the plane of the support locus.

The lids 14 are successively deposited in any desired manner on the rollers 15 and 17 for rotation thereby. This may as shown in FIGURE 3, be by a chute 16 where the lids drop a short distance edgewise onto the rollers and are rotated thereby to become stabilized in an upward position before they have the opportunity to flop over. In the preferred form of the invention the lids shown in solid line all are pre-oriented to have their centres of gravity offset horizontally to the left in the drawing in the spinning attitude they assume on the rollers from the widest part of the rim where the article contacts the rollers. A lid with its centre of gravity offset to the right from such widest part is shown to the right in the drawing. When the lids are rotated, the offset of the lid centre of gravity causes it to rotate or precess about a vertical axis in a sense to cause it to progress to the left axially along the parallel rollers. The lids may therefore stack themselves against a stationary vertical plate at the left hand end of the parallel rollers for removal or other disposition.

If lids were dropped on with centres of gravity offset in opposite directions it will be seen that the lids will progress in opposite directions along the axis of the rollers.

Although the specific embodiment has been described in connection with a lid whose rim wall is slightly conical rather than cylindrical, it should be stated here that the invention will operate where the widest portion of the rim wall is cylindrical and of constant diameter so that the initial contact with the rollers (when the axis of rollers and article are parallel) is an area rather than a line contact over the extent of such wall. In such case the phrases "centre of said rim in an axial direction" or "locus of contact" refer to the intersection of the widest diameter of said rim wall with a plane perpendicular to the axis of revolution and located to bisect the axial dimension of the widest diameter of said rim wall. It would not be theoretically expected that gyroscopic phenomena would occur where the centre of gravity is not axially offset from the range of the widest portion of the rim but is merely offset from the axial centre of such wider portion. The gyroscopic effects do however occur in practice because in practice the rim portion is not a perfect cylinder, the rollers are not perfect cylinders and vibration of one kind or another occurs. The article therefore tends to act as if its rim were convex outward rather than cylindrical.

It is noted that where the roller axes are tilted (although not enough to cause free sliding) the gyroscopic effect is increased or decreased relative to the situation where the rollers are horizontal due to the change in the gravitational moment which is directly related to the amount of precession. This is illustrated in the schematic drawings of FIGURES 5 and 6 where in FIGURE 5 is schematically shown a cross-section of a lid of the type shown in FIGURE 4 supported on rollers with horizontal axes, as represented by the horizontal line R. The centre of gravity C.G. is shown and the dimension A represents the length of the gravitational moment arm measured horizontally from the vertical projection of the position of the centre of gravity. The gravitational moment thus caused should be compared with that created with the tilted rollers in FIGURE 6 where lids similar to that of FIGURE 6 are shown tilted right while spinning on the rollers and with one lid open to the left and the other open to the right. With the lid open to the left it will be seen that the horizontal moment arm $A_3$ for the gravitational moment is increased so that for a given weight of lid and speed of rotation the tendency to precess will be increased over FIGURE 5. On the other hand with the lid opened toward the right it will be seen that the moment arm $A_2$ is decreased and hence the precession will be decreased. It will also be noted that, as shown in the drawings, the right hand lid would travel downhill and the left hand lid would travel uphill. It will be noted that if the tilt is further increased, then in relation to the left hand lid, a point will be reached, where the centre of gravity is vertically over the contact point C. At the last mentioned tilt, the gravitational moment is zero and the article will not precess, and hence will remain spinning at its location on the rollers without progressing axially in either direction therefrom. If the tilt of the rollers is further increased, then at the left hand lid of FIGURE 6, the vertical projection from the centre of gravity will pass to the right of the contact point C in which case the gravitational moment will be in the opposite sense to that shown in FIGURE 6 for the left hand lid, so that the precession will be in the opposite sense and the left hand lid will travel to the right—it being understood, in all cases, that the tilting is not sufficient to cause free sliding.

It will be seen that for the effects of such precession to be functional, that the axes of the rollers must be sufficiently close to horizontal to prevent the free axial sliding of such lids along such rollers. Thus the angle will be determined by the frictional qualities of the rollers and the articles.

It will be obvious that the process disclosed will operate equally well with artcles other than lids which may be supported on a surface of revolution thereof on rotating rollers, with the centre of gravity thereof offset axially relative to the locus of contact of the article with the rollers.

Although support of the rotating articles on two rollers, as shown, is felt to be the most advantageous method of carrying out the invention it is noted that the invention may be carried out where the article is rotated by and a least partially supported by at least one roller where such support is such that the rotating article may tip relative to the roller and rotate relative to such roller about an axis perpendicular to the rotation axis of the article and its axis of tip. Examples of this are shown schematically in FIGURES 7 and 8 where, in FIGURE 7 a single rotating roller $R_s$ partially suports and rotates the lid L assisted by non-rotating guides G. In FIGURE 8 the lid L is supported on three rollers rotating in the same sense and peripherically disposed about the intended lid position.

I claim:
1. A method of using gyroscopic precession to cause the travel of articles shaped to provide a surface of revolution including a rim defined by the largest dimensions of said body when viewed along the axis of such surface of revolution, such articles having a centre of gravity displaced axially from the centre, in said axial direction of said rim, comprising the steps of:
   causing such an article to be rotated by and at least partially supported on said rim on at least one cylinder, all such cylinders being approximately parallel and rotating in the same sense,
   while maintaining said cylinders close enough to the horizontal to prevent predominately slipping movement of the article axially relative to the cylinder, whereby said article will gyroscopically precess so that said surface of revolution axis makes an angle determined by rotational and gravitational moments acting on the article, with the axes of rotation of all such cylinders,
   and said article travels axially in connection with said rollers.

2. A method as claimed in claim 1 wherein said support is achieved by two approximately parallel rollers rotating in the same sense and located closely enough together to jointly support said article at said locus.

3. A method of handling articles which are shaped to provide a surface of revolution, shaped so that said article may be rotated on a circular locus forming part of said surface of revolution and at least partially supported on at least one roller, all such supporting rollers being approximately parallel, said articles defining a centre of gravity offset from said locus in a direction parallel to the axis of said surface of revolution, comprising the steps of:
   arranging such rollers to at least partially suppport said article with their axes less tilted to the horizontal than the angle at which said bodies, when so rotated, will slide freely along said rollers in the direction defined by the axis of said rollers;
   causing rotation of rollers in the same rotational sense at a speed to, at least partially, support said article on said locus while rotating,
   whereby said bodies will travel axially along said rollers in a sense determined by the sense of rotation and the sense of offset of said centre of gravity.

4. A method as claimed in claim 3 wherein said support is achieved by two approximately parallel rollers rotating in the same sense and located closely enough together to jointly support said article at said locus.

5. A method as claimed in claim 2 wherein said two rollers are substantially parallel.

6. A method as claimed in claim 4 wherein said two rollers are substantially parallel.

References Cited
UNITED STATES PATENTS 3,024,889 3/1962 Reading.
3,139,172 6/1964 McClelland.

EDWARD A. SROKA, Primary Examiner